United States Patent [19]

Fukushima et al.

[11] Patent Number: 5,366,418
[45] Date of Patent: Nov. 22, 1994

[54] CHAIN GUIDE DEVICE IN ENGINE

[75] Inventors: Yuji Fukushima, Ikeda; Atsushi Kumakura, Takatsuki, both of Japan

[73] Assignee: Tsubakimoto Chain Co., Osaka, Japan

[21] Appl. No.: 203,455

[22] Filed: Feb. 28, 1994

[30] Foreign Application Priority Data

Mar. 1, 1993 [JP] Japan ............................. 5-007664[U]

[51] Int. Cl.$^5$ ............................................. F16H 7/00
[52] U.S. Cl. ........................... 474/111; 123/90.27; 123/90.31
[58] Field of Search .............. 474/101, 109–111, 474/117, 133–135, 136, 138, 140

[56] References Cited

U.S. PATENT DOCUMENTS

| | | | |
|---|---|---|---|
| 4,480,603 | 11/1984 | Tsuboi | 123/90.27 |
| 4,553,509 | 11/1985 | Mezger et al. | 474/111 X |
| 4,633,826 | 1/1987 | Tominaga et al. | 123/90.31 |

FOREIGN PATENT DOCUMENTS

| | | |
|---|---|---|
| 820051986 | 11/1984 | Japan . |
| 69-0101987 | 10/1985 | Japan . |
| 63-176853 | 11/1986 | Japan . |

*Primary Examiner*—Michael Powell Buiz
*Attorney, Agent, or Firm*—Price, Gess & Ubell

[57] ABSTRACT

A fixed guide and a first movable guide the lower portion of which being pivotally supported are disposed on both sides of a path of rotational movement of a camshaft driving chain which interlocks a crankshaft with a camshaft. One end of a second movable guide which regulates a path of rotational movement of a pump driving chain which interlocks the crankshaft with an oil pump disposed adjacent to the crankshaft is pivotally supported at a shaft of the first movable guide, and a torsion spring is provided between free end of the second movable guide and the fixed guide.

4 Claims, 4 Drawing Sheets

1

CHAIN GUIDE DEVICE IN ENGINE

BACKGROUND OF THE INVENTION

1. Technical Field of the Invention

The present invention relates to a chain guide device which is provided in an engine for interlocking a crankshaft with camshaft, and the crankshaft with an attachment or auxiliary machineries.

2. Description of Related Art

A fixed guide and movable guide urged by tension adjusting means have heretofore been utilized in order to prevent chains from loosening and deflection in their rotational movement where a crankshaft is interlocked with a camshaft, and the crankshaft is connected with an oil pump and an attachment or auxiliary machinery such as water pump.

In a device disclosed in Japanese Published Unexamined Utility Model Application No.138435/1988, for example, there are arranged on both sides of a path of rotational movement of a chain 34 tension adjusting means 35 which provides a proper tension to the chain 34 that interlocks a crankshaft 32 with a camshaft 33 in an engine 31, and a pair of guide members 36a and 36b provided at the upper and lower portions for regulating the path of rotational movement of the chain 34 with further arrangement of fixed guide members 39a and 39b for regulating a path of rotational movement of a chain 38 which interlocks the crankshaft 32 with an attachment such as balancer shafts 37a, 37b provided on both sides of the crankshaft 32, and a position adjusting guide member 40 as shown in FIG. 4.

However, when the guide members 39a, 39b and 40 provided for the chain 38 are attached independent of the guide members 36a and 36b for the chain 34 provided for the camshaft 33 as described above, the number of parts is increased to eventually raise a manufacturing cost, and it further necessitates an additional space. In the case when only a fixed-type guide is used, there causes a disadvantage of making noise and in its durability since such an arrangement can not eliminate loosening of the chain. In order to solve such a problem, if an arrangement is made to provide the chain 38 with a tension by a movable guide, and if an arrangement is made to regulate the amount of movement of the movable guide, the construction of a device becomes more complicated to eventually raise a manufacturing cost and necessitates an additional space since a hydraulic or mechanical ratchet mechanism would need to be applied. Under such a construction, attachment or auxiliary machinery can not be disposed adjacent to the crankshaft 32, and the manufacture of a compact engine is obstructed.

SUMMARY OF THE INVENTION

Accordingly, it is an object of the present invention to provide a chain guide device for an engine which is capable of providing a proper tension to a chain which is used for an attachment and auxiliary machinery in an engine whereby a compact engine can be manufactured with low manufacturing cost and reduced space for the disposition of the attachment.

In order to accomplish the object, the chain guide device of the present invention comprises:

a fixed guide disposed on one side of a path of rotational movement of a first chain;

a first movable guide disposed on the other side of the path of rotational movement of the first chain, the lower portion being pivotally supported on the main body of an engine;

pressing means for pressing and urging the upper portion of the first movable guide toward the first chain;

a second movable guide the basic end of which being pivotally supported at a shaft which pivotally supports the first movable guide for regulating a path of rotational movement of a second chain; and spring means provided between the free end portion of the second movable guide and the fixed guide for pressing and urging the second movable guide toward the second chain.

According to the present invention, the first movable guide provided with the first chain for driving a camshaft and the second movable guide provided with the second chain for driving attachment and auxiliary machinery are pivoted to a common shaft so that the number of parts to be used for those movable guides may be reduced which eventually eliminates manufacturing process. It further eliminates a space for the disposition of parts. Since the pressing means for the second movable guide is provided with a spring member which is arranged between the fixed guide, the construction of the device becomes extremely simple, and a tension supplying guide device for the second chain which is provided for attachment or auxiliary machinery may be manufactured compactly with a low manufacturing cost. The chain provided for attachment and auxiliary machinery is securely guided, and a compact engine may be manufactured with low manufacturing cost.

These and other objects and features of the present invention will become more apparent from the following description taken in conjunction with the accompanying drawings which illustrate specific embodiments of the invention.

DESCRIPTION OF THE PREFERRED EMBODIMENT

An embodiment of the present invention will now be described hereinafter referring to FIGS. 1 through 3.

Figure 1:
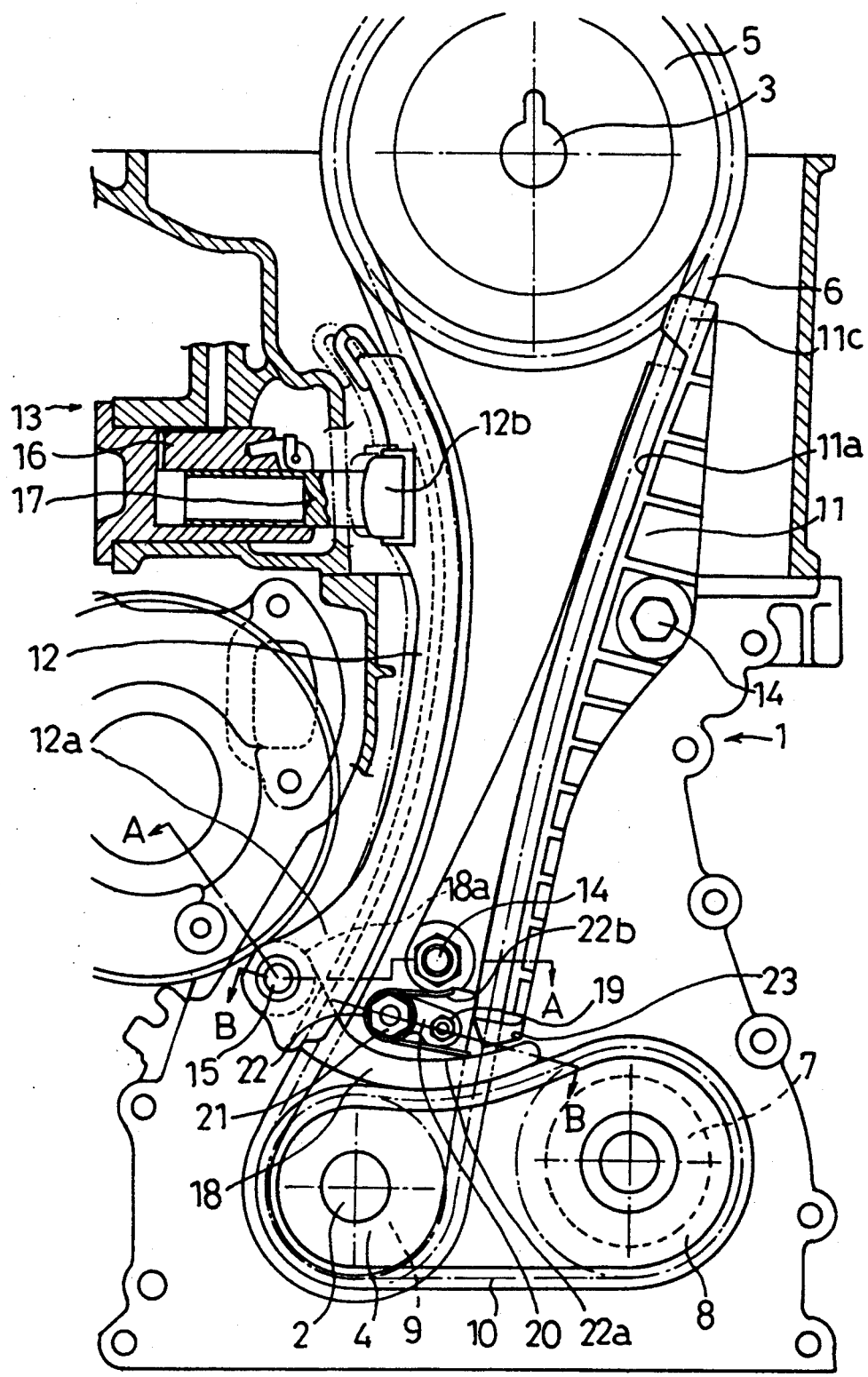
FIG. 1 is a cross-sectional front view showing a principal part of an engine which is applied to an embodiment of the present invention.
Figure 2:
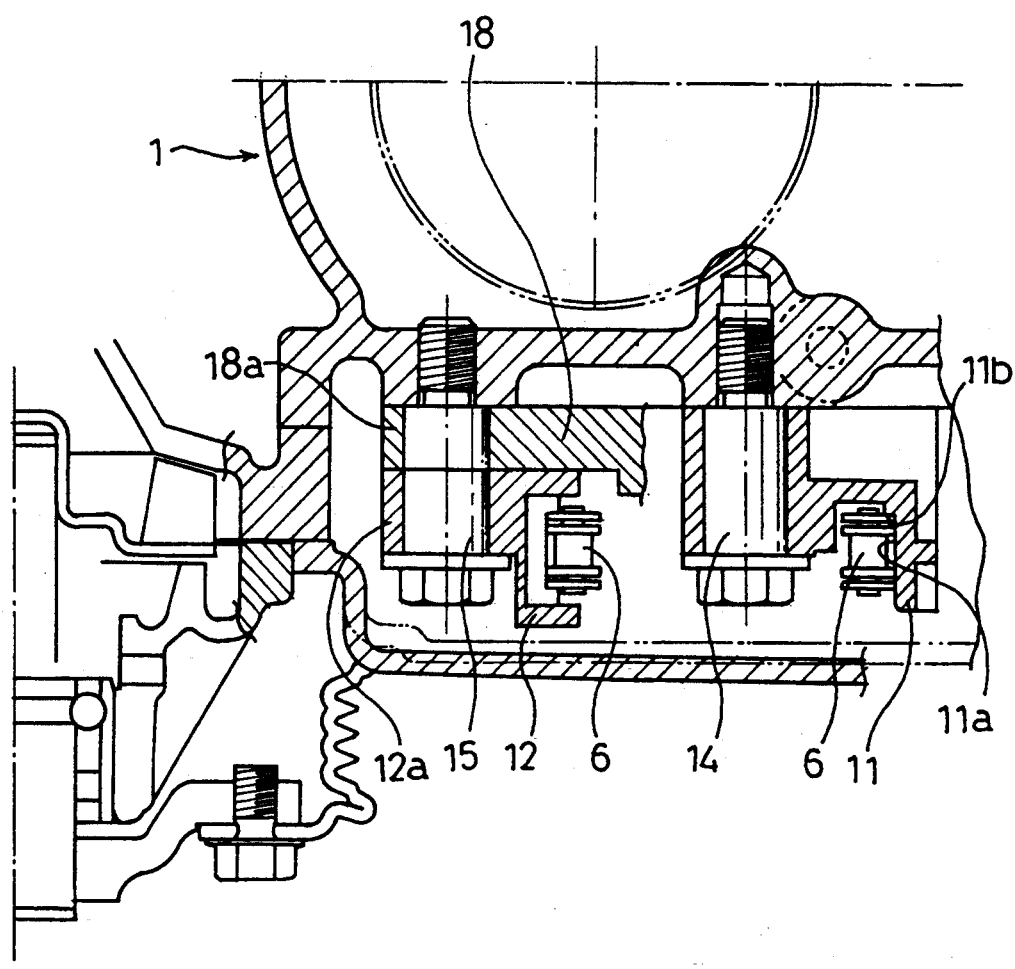
FIG. 2 is a cross-sectional view taken along line A—A of FIG. 1.
Figure 3:
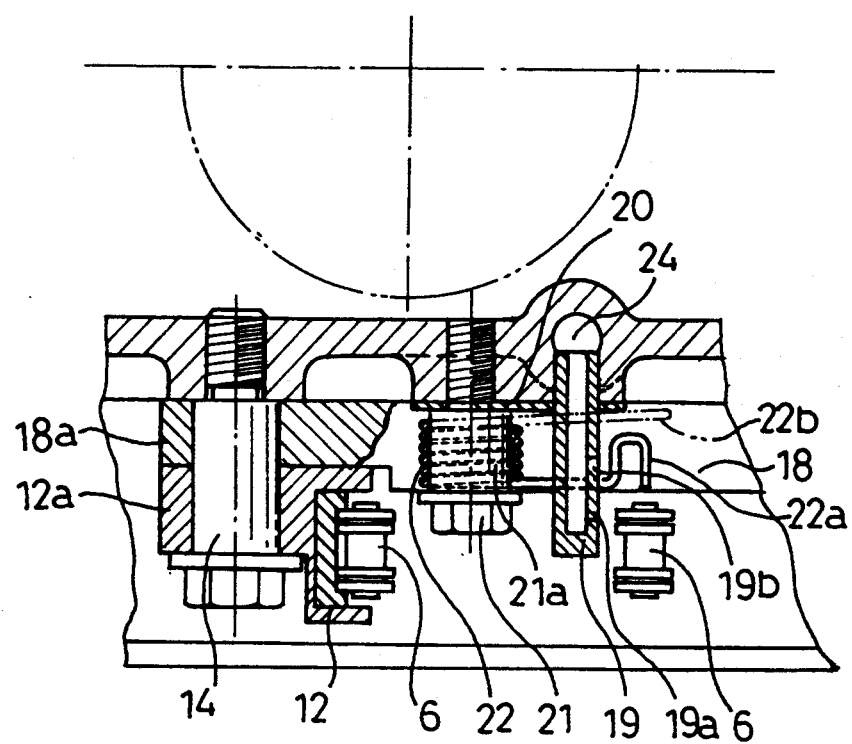
FIG. 3 is a cross-sectional view taken along line B—B of FIG. 1.
Figure 4:
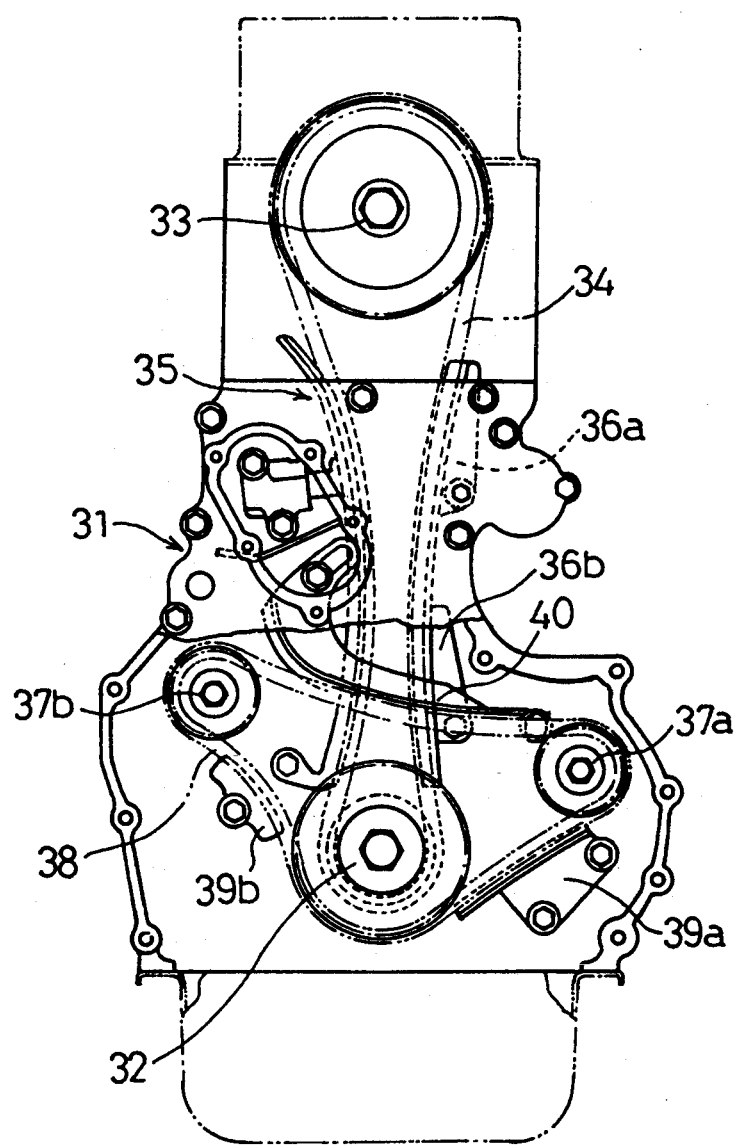
FIG. 4 is a front view showing a principal part of a conventional engine.

As shown in FIGS. 1 through 3, there are disposed a crankshaft 2 at the lower portion of the main body of an engine 1, and a camshaft 3 at the upper portion respectively. A cam driving pulley 4 is attached to one end of the crankshaft 2, and a camshaft pulley 5 is attached to one end of the camshaft 3 respectively. A camshaft driving chain 6 is wound around between the pulleys 4 and 5. An oil pump 7 is disposed adjacent to one side of the crankshaft 2, and a pump driving chain 10 is wound around between an oil pump pulley 8 which is attached to a driving shaft of the oil pump and a pump driving pulley 9 attached to the crankshaft 2.

On one side of a path of rotational movement of the camshaft driving chain 6, there is provided a fixed guide 11, and on the other side of the path, a first movable guide 12 is arranged with its lower end portion 12a pivotally supported. A pressure receiving member 12b which is disposed adjacent to the upper end portion of the first movable guide 12 is pressed and urged by a pressing means 13 to provide a predetermined tension to the camshaft driving chain 6.

The fixed guide 11 is comprised of a member which extends from the close vicinity to the cam driving pulley 4 to the close vicinity to the camshaft pulley 5, and is fixed with a bolt 14 at its middle portion and the lower portion. On the guide member 11, there are provided a guide surface 11a which is curved a little toward the inside where it comes in engagement with the outer periphery of the camshaft driving chain 6, and a guide surface 11b which engages with inner surface of the camshaft driving chain 6. At the upper end portion of the guide member 11, there is provided a separation preventive member 11c which engages with an outer surface of the camshaft driving chain 6 to prevent the chain from being separated.

The first movable guide 12 is comprised of a member which extends from the close vicinity to the cam driving pulley 4 to the close vicinity to the camshaft pulley 5, and the pressing means 13 is comprised of a cylinder 16 and a piston 17 whose leading end comes in contact with the pressure receiving member 12b.

A second movable guide 18 is provided above a path of rotational movement of the pump driving chain 10, and one end portion of the guide 18a is pivotally supported by a shaft 15 which also pivotally supports the first movable guide 12. Under the bolt 14 at the lower portion of the fixed guide 11, an oil injection nozzle 19 is provided for injecting lubricating oil toward the camshaft driving chain 6 and the pump driving chain 10, and a nozzle mounting plate 20 to which the oil injection nozzle 19 is attached is fixed on the main body of the engine 1 with a bolt 21.

The shaft portion 21a of the bolt 21 is held by a torsion spring 22 which is fitted thereon. One end of the torsion spring 22 comes in contact with the second movable guide 18, and the other end comes in contact with the outside of a boss section into which the bolt 14 at the lower end portion of the fixed guide 11 is pierced. The second movable guide 18 is thus pressed and urged by the torsion spring 22 to provide the pump driving chain 10 with a predetermined tension. In order to prevent the second movable guide 18 from being largely sprung up in resisting the urging force of the torsion spring 22, a stopper section 23 is provided at the lower end of the fixed guide 11 so that the displacement which exceeds a fixed amount with respect to the second movable guide 18 is prevented.

The base end of the oil injection nozzle 19 is connected and pierced into an oil path 24 formed in the main body of the engine 1, and on the leading end side of the nozzle 19, jet orifices 19a, 19b are bored corresponding to the camshaft driving chain 6 and pump driving chain 10.

Under the above-described arrangement, when the cam driving pulley 4 and the pump driving pulley 9 are rotated together with the crankshaft 2, the camshaft 3 is simultaneously rotated through the camshaft driving chain 6 and camshaft pulley 5, and an oil pump 7 is driven through the pump driving chain 10 and oil pump pulley 8. One side of the path of rotational movement of the camshaft driving chain 6 is guided by the fixed guide 11, and the other side is guided by the first movable guide 12. Since a tension is given inward by the pressing means 13, a rotational movement of the chain 6 is stabilized. The upper portion in the path of rotational movement of the pump driving chain 10 is guided by the second movable guide 18. Since the second movable guide 18 is pressed downward by the torsion spring 22 to provide the guide with a tension, a rotational movement of the chain 10 is stabilized.

Since the crankshaft 2 and oil pump 7 are disposed close to each other, and the distance between the axes is short, the rotational movement of the chain may be stabilized by the second movable guide 18 only. Even if the pump driving chain 10 is sprung up largely due to resisting against an urging force of the torsion spring 22 due to a change in torque and the like, the second movable guide 18 is protected from displacement by the stopper section 23. The pump driving 10 is thus not fluttered. The arrangement of the camshaft driving chain 6 and pump driving chain 10 is thus improved in reducing noise and in their durability.

According to the embodiment of the present invention, the first movable guide 12 and the second movable guide 18 are pivoted by the common shaft 15 so that the parts and fitting process may be minimized without using unnecessary space for attaching the movable guides 12 and 18. Further, the guides are held by the fixed bolt 21 which holds the plate 20 of the oil injection nozzle 19, and the pressing means of the second movable guide 18 is comprised of the torsion spring 22 so that a compact engine may be constructed in a simple structure with low manufacturing cost.

In the embodiment described above, the torsion spring 22 which is held by the fixed bolt 21 of the oil injection nozzle 19 is exemplified as a pressure urging means of the second movable guide 18, however, an elastic body such as a coil spring, for instance, may be utilized at the lower end portion of the fixed guide 11.

In the embodiment, it has been exemplified that the oil pump 7 is disposed adjacent to the crankshaft 2, however, other attachment and auxiliary machinery such as water pump and alternator may be arranged adjacent to the crankshaft 2 in place of the oil pump 7 whereby the same effect can also be obtained for an engine.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A chain guide device in an engine for guiding a first chain which interlocks a crankshaft with a camshaft, and a second chain which interlocks said crankshaft with an attachment or auxiliary machinery disposed adjacent to the crankshaft, comprising:

a fixed guide disposed on one side of a path of rotational movement of a first chain;

a first movable guide disposed on the other side of the path of rotational movement of the first chain, the lower portion being pivotally supported on the main body of an engine;

pressing means for pressing and urging the upper portion of the first movable guide toward the first chain;

a second movable guide a base end of which being pivotally supported at a shaft which pivotally supports the first movable guide for regulating a path of rotational movement of a second chain; and spring means provided between free end portion of the second movable guide and the fixed guide for pressing the second movable guide toward the second chain.

2. A chain guide device in an engine as defined in claim 1, wherein said pressing means is comprised of a cylinder and piston.

3. A chain guide device in an engine as defined in claim 1, wherein said spring means is comprised of a torsion spring.

4. A chain guide device in an engine as defined in claim 3, wherein said torsion spring is held by a bolt which fixes an injection nozzle.

* * * * *